United States Patent Office 3,224,148
Patented Dec. 21, 1965

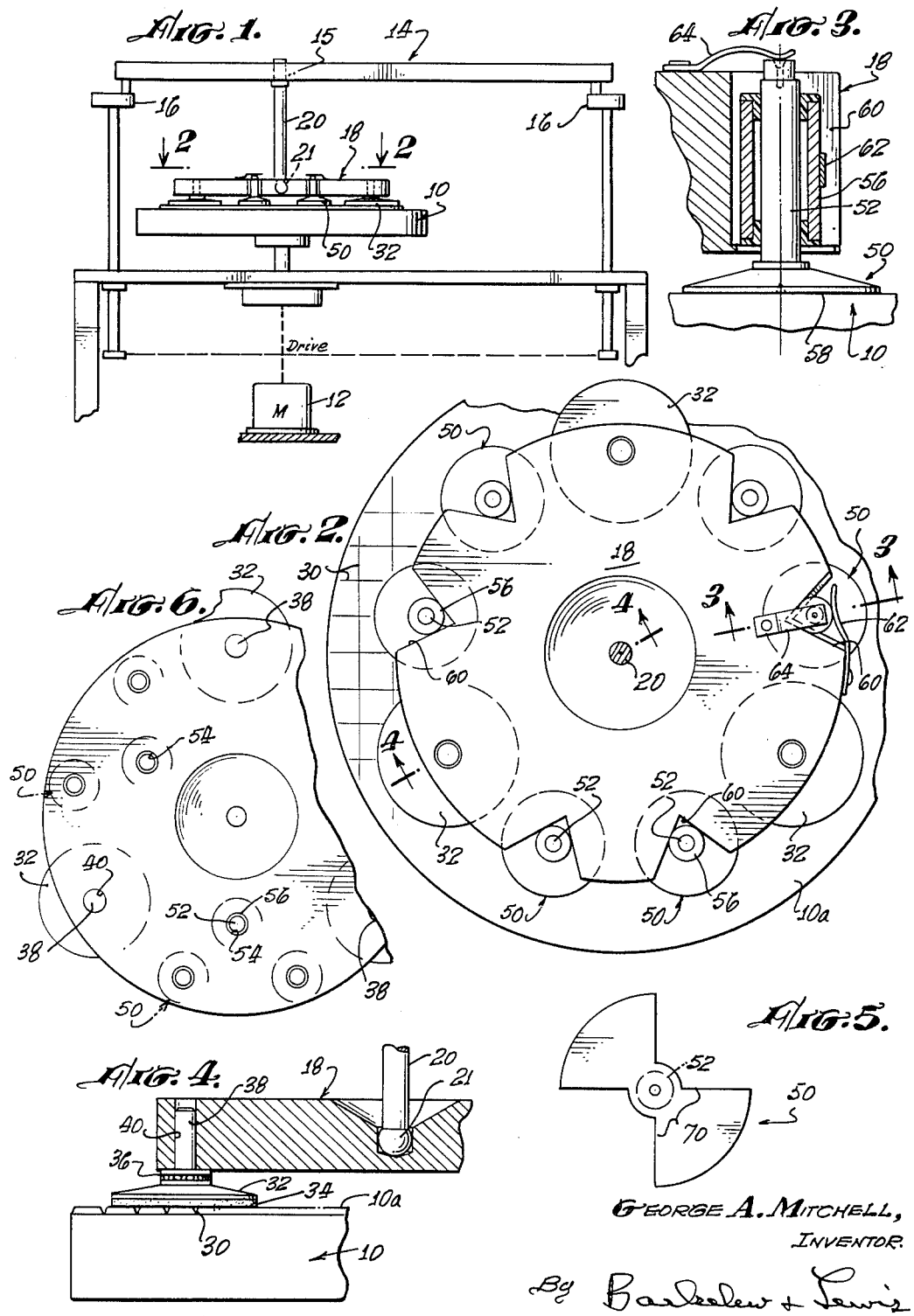

3,224,148
METHOD AND APPARATUS FOR PRODUCING A REFLECTIVE ROTATING SHUTTER
George A. Mitchell, 687 Prospect Crescent, Pasadena, Calif.
Filed Aug. 5, 1963, Ser. No. 299,797
12 Claims. (Cl. 51—328)

This invention has to do with the production of a reflective rotating shutter, such for example as those used in motion picture cameras for intermittently reflecting an image to, e.g. a view finder alternatively with passing the image to film. Difficulty has been experienced in producing and maintaining a reflex surface on such a rotating shutter that will reflect an unwavering image.

The present invention solves that problem by finishing and polishing the rotary reflective shutter surface with the shutter mounted to rotate on its permanent spindle which may preferably be mounted for rotation in its permanent bearing. By permanent spindle and/or spindle bearing, I mean the spindle and/or bearing on or in which the shutter is finally mounted in the ultimate machine, e.g. kinetoscope. The method and apparatus of the invention for so processing the shutter involves the rotative mounting of the shutter, or a plurality of shutters in one operation, on their own spindles and/or bearings, in or on a carrier block which is supported on a rotating lap preferably by three pads or "rubbers" (as they are known in optical work), the shutter spindles being mounted and kept with their axes reasonably close to normal of the lap surface; with the shutter or shutters pressed onto the lap surface individually.

The result of the operation is to produce a polished shutter surface as a surface of revolution about the spindle axis. Ideally that surface may be a flat, but for reflection to e.g. a view finder, a slightly conical or even convex or concave deviation from flatness is not objectionable. Occasional inspection during the polishing operation reveals the closeness to flatness, and if correction is desired or necessary correction of the support of the carrier block preferably by the supporting pads or rubbers is indicated.

A detailed description of preferred embodiments of the method and apparatus and the product follows; with reference to the accompanying drawings, in which:

FIG. 1 is a schematic elevation of the illustrative apparatus;
FIG. 2 is an enlarged plan taken as indicated by 2—2 on FIG. 1;
FIG. 3 is a further enlarged detail section on line 3—3 of FIG. 2;
FIG. 4 is a detail section on line 4—4 of FIG. 2;
FIG. 5 is a view of the finished shutter face; and
FIG. 6 is a plan similar to FIG. 2 but showing a variation.

FIG. 1 illustrates schematically the essentials of an optical surface producing machine, including a rotating lap 10 driven from motor 12, and the work shifter 14 here shown as driven by two cranks 16 and connected to carrier element 18 (which here supplants what may ordinarily be the optical work itself) by connection 20 which leaves carrier 18 free to rise and fall or tip and to rotate. The ball and socket connection indicated at 21 allows rotative and tipping freedoms, while 20 allows rise and fall by being slidable through 14 at 15. Carrier 18 is only shifted over the rotating face of the lap by the device 14. The two cranks 16 are driven randomly and, ordinarily, from the same motor 12. The shift of the work over the face of rotating lap 10 is ordinarily adjustable and may be so here.

Reference is now made more particularly to FIGS. 2, 3 and 4. As shown there, the rotating lap 10 may be of any suitable body material with a lap facing of, say, hard pitch indented by crossed scorings 30. Carrier 18, which is a carrier of the work, is preferably relatively heavy, say of cast iron, and is preferably supported on the lap face by the three freely rotating pads 32 which may have facings 34 of suitable material, such as Pyrex, which is as hard or harder than the mirror material. End thrust bearings 36 support 18 on the three pads, and the pad spindles 38 rotate in bores 40 in 18. The pads are relatively large and by the shift of 14, they cover an area on the lap within which the work pieces 50 ride. Abrasive and polishing materials such as fine Carborundum and rouge are fed to the lap as in usual optical grinding and polishing practise, and the function of the pads is to produce and maintain the lap in flat condition. Pressure on the pads is relatively great, due to the weight of 18. Pressure on the individual work pieces 50 may be relatively small.

Work pieces 50 with their permanent rigid spindles 52 are rotatively mounted on carrier 18 with their spindle axes normal to the under face of 18 and parallel to pad spindles 38. Assuming the under face of carrier 18 to be flat and supported by pads 32 parallel to the lap face, the shutter spindles 52 are normal to the lap face. Shutter spindles 52 may either be mounted directly in bores in 18, such as the bores shown at 54 in FIG. 6, or may be mounted in their permanent bearings 56 (FIG. 3) in such bores. Preferably however, for easy removal and inspection of the shutter faces 58, the spindle bearings 56 are mounted in peripheral notches 60 in 18, held in place in those notches by removable springs 62. That mounting is shown in detail for one of the bearings in FIGS. 2 and 3. Spindles 52 are vertically slidable and rotates freely either in bores 54 or in their bearings 56, and the faces 58 of the shutter work pieces bear on the lap face either merely by their own weight, or with the additional pressure of a spring such as shown at 64. If such a spring is used the work pieces support at least a part of the weight of carrier 18.

With the larger pads 32 keeping the lapping face 10a flat, shutter spidles 52 will be maintained normal to that lap face. The resultant grinding and polishing of shutter faces 58 will produce polished faces accurately normal to the axes of spindles 52. If wear on the pads is uneven or they produce a slightly non-flat lap face, the ultimate polished faces 58 may be, e.g., slightly conical. But in any circumstance those finished faces will be surfaces of revolution about the axes of the permanent spindles 52.

Shutter bodies 50 are preferably of such material and form as to be rigid on their spindles and not subject to such deformation as might change the relation of their polished faces to their spindle axes. Their faces may be ground and polished in the form of complete disks, afterwards cut out on such lines as shown at 70 in FIG. 5 to provide an opening or openings in the shutter. Preferably the shutter bodies 50 are cut as at 70 before polishing. Segments to fill the openings are cemented in with pitch or other suitable material to maintain an effectively continuous circular work face. In either case, the remaining polished face is finally treated for high reflection, as by aluminizing.

I claim:
1. Apparatus for producing a true surface of revolution on a rotative member such as a reflective shutter, comprising
   in combination with an optical surface producing machine that has a rotating flat lap and a shifting work carrier carried on that lap by three relatively large and freely rotating rubbers;
   means mounting a reflective shutter blank rigidly on its own permanent spindle, and means mounting the spindle on the work carrier on an axis substantially normal to the lap surface and for free rotation and for axial movement of the shutter blank toward the lap surface.

2. The combination defined in claim 1 and in which the spindle is rotatively and axially slidably mounted in its own permanent bearing, and the bearing is mounted on the work carrier.

3. The combination defined in claim 2 and in which, the work carrier has a peripheral notch and the spindle bearing is removably mounted in the notch.

4. The combination defined in claim 1 and in which said means mounting the blank carrying spindle on the work carrier is releasable for removal of the blank an its spindle from the work carrier.

5. The combination defined in claim 1 and also including
means yieldingly pressing the blank relative to the work carrier toward the lap surface.

6. Apparatus for producing a true surface of revolution on a rotative member such as a reflective shutter, comprising
in combination with an optical surface producing machine that has a rotating flat lap and a work carrier shifting parallel to said lap surface
means mounting a plurality of reflective shutter blanks rigidly on their own permanent spindles with the outer faces of the blanks substantially normal to the axes of the spindles,
means mounting the several spindles on the work carrier on circularly spaced axes substantially normal to the lap surface and for free rotation and for axial movement relative to the work carrier of the shutter blanks toward the lap surface,
and yielding means carried by the work carrier and yieldingly pressing the shutter blanks toward the lap surface to press their outer faces substantially flatly onto the lap face.

7. The combination defined in claim 6 and in which the spindles are each rotatively and axially slidably mounted in their own permanent bearings, and the several bearings are mounted on the work carrier.

8. The combination defined in claim 7 and in which the work carrier has circularly spaced peripheral notches and the several spindle bearings are removably mounted in said notches.

9. The combination defined in claim 6 and in which there are at least three blank carrying spindles mounted on the work carrier in circular spacings from each other.

10. The combination defined in claim 9 and in which said means mounting the several spindles on the work carrier are releasable for removal of the blanks and their spindles from the work carrier.

11. The method of producing a true polished face surface of revolution on a rotative member such a reflective shutter in an optical surface producing machine that has a rotating flat lap and a shifting work carrier
said method comprising the steps of,
mounting at least three shutter blanks rigidly on their own permanent spindles which provide fixed axes of rotation for the blanks substantially in the planes of their outer faces,
mounting such blanks on the work carrier by mounting their spindles for free rotation about and for axial movements along said axes on the work carrier with the outer face surfaces of the blanks bearing substantially flatly against the rotative lap face, said mounted axes being circularly spaced from each other,
yieldingly pressing each blank toward the lap face relative to the work carrier,
and rotating the lap and simultaneously shifting the work carrier.

12. The method of producing a true polished face surface of revolution on a rotative member such as a reflective shutter in an optical surface producing machine that has a rotating flat lap and a shifting work carrier carried on the lap by three relatively large and freely rotating rubbers;
said method comprising the steps of,
mounting a shutter blank rigidly on its own permanent rotative spindle which provides a fixed axis of rotation for the blank substantially in the plane of its outer face surface,
then mounting such blank on the work carrier by mounting its spindle for free rotation about and for axial movement along said axis on the work carrier with the face surface of the blank bearing substantially flatly against the rotative lap face,
and rotating the lap and simultaneously shifting the work carrier parallel to the lap face.

References Cited by the Examiner
UNITED STATES PATENTS
2,830,412   4/1958   Shurson _____ 51—227

HAROLD D. WHITEHEAD, *Primary Examiner.*

J. SPENCER OVERHOLSER, *Examiner.*

JESSE L. TATE, *Assistant Examiner.*